(12) United States Patent
Yamada

(10) Patent No.: US 6,735,732 B2
(45) Date of Patent: May 11, 2004

(54) CLOCK ADJUSTING METHOD AND CIRCUIT DEVICE

(75) Inventor: Jun Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/460,393

(22) Filed: Jun. 13, 2003

(65) Prior Publication Data

US 2003/0200496 A1 Oct. 23, 2003

Related U.S. Application Data

(62) Division of application No. 09/537,776, filed on Mar. 29, 2000.

(30) Foreign Application Priority Data

Sep. 2, 1999 (JP) ............................................ 11-249224

(51) Int. Cl.[7] .............................. G01R 31/28; G06F 1/12
(52) U.S. Cl. ......................... 714/744; 713/401; 326/93
(58) Field of Search ................................ 714/727, 731, 714/744, 798, 814, FOR 100, FOR 300; 326/93; 327/141, 144, 152, 153, 161; 713/400, 401, 500, 501

(56) References Cited

U.S. PATENT DOCUMENTS 5,737,589 A * 4/1998 Doi et al. ................... 713/503
5,794,020 A * 8/1998 Tanaka et al. .............. 713/401
6,185,710 B1 * 2/2001 Barnhart ..................... 714/727
6,629,222 B1 * 9/2003 Jeddeloh ..................... 711/167

FOREIGN PATENT DOCUMENTS

| JP | 5260033 | 10/1983 |
| JP | 6-77785 | 3/1994 |
| JP | 11-31964 | 2/1999 |

* cited by examiner

*Primary Examiner*—Albert Decady
*Assistant Examiner*—Matthew C. Dooley
(74) *Attorney, Agent, or Firm*—Westerman, Hattori, Daniels & Adrian, LLP

(57) ABSTRACT

A clock adjusting method adjusts a first clock supplied to a first flip-flop which is coupled to an output of a first circuit and a second clock supplied to a second flip-flop which is coupled to an input of a second circuit, where the first and second flip-flops are coupled via a transmission path. The clock adjusting method includes the steps of (a) transmitting data from the first flip-flop to the second flip-flop via the transmission path while varying delay quantities of the first and second clocks, (b) obtaining a combination of the delay quantities of the first and second clocks with which the data is correctly transmitted from the first flip-flop to the second flip-flop, and (c) adjusting the delay quantity of at least one of the first and second clocks based on the combination so as to synchronize operations of the first and second flip-flops.

5 Claims, 12 Drawing Sheets

FIG.11

|  |  | -7 | -6 | -5 | -4 | -3 | -2 | Δt -1 | 0 | +1 | +2 | +3 | +4 | +5 | +6 | +7 |
|---|---|---|---|---|---|---|---|---|---|---|---|---|---|---|---|---|
| A1 (='0') | B1-1 | 0 | 0 | 0 | 1 | 1 | 1 | 1 | 1 | 1 | 1 | 0 | 0 | 0 | 0 | 0 |
|  | B1-2 | 0 | 0 | 0 | 0 | 0 | 1 | 1 | 1 | 1 | 1 | 1 | 1 | 1 | 0 | 0 |
|  | B1-3 | 0 | 0 | 1 | 1 | 1 | 1 | 1 | 1 | 0 | 0 | 0 | 0 | 0 | 0 | 0 |
|  | B1-4 | 0 | 0 | 0 | 0 | 0 | 1 | 1 | 1 | 0 | 0 | 0 | 0 | 0 | 0 | 0 |
| A2 (='0') | B2-1 | 0 | 0 | 0 | 0 | 1 | 1 | 1 | 1 | 1 | 1 | 1 | 0 | 0 | 0 | 0 |
|  | B2-2 | 0 | 0 | 0 | 1 | 1 | 1 | 1 | 1 | 1 | 0 | 0 | 0 | 0 | 0 | 0 |
|  | B2-3 | 0 | 1 | 1 | 1 | 1 | 1 | 1 | 1 | 0 | 0 | 0 | 0 | 0 | 0 | 0 |
|  | B2-4 | 0 | 0 | 0 | 0 | 0 | 1 | 1 | 1 | 1 | 1 | 1 | 0 | 0 | 0 | 0 |
| ⋮ | ⋮ | | | | | | ⋮ | | | | | | | | | |
| An (='0') | Bn-1 | 0 | 0 | 1 | 1 | 1 | 1 | 1 | 1 | 0 | 0 | 0 | 0 | 0 | 0 | 0 |
|  | Bn-2 | 0 | 0 | 0 | 1 | 1 | 1 | 1 | 1 | 1 | 1 | 0 | 0 | 0 | 0 | 0 |
|  | Bn-3 | 0 | 0 | 0 | 0 | 0 | 1 | 1 | 1 | 1 | 0 | 0 | 0 | 0 | 0 | 0 |
|  | Bn-4 | 0 | 0 | 0 | 0 | 0 | 1 | 1 | 1 | 1 | 1 | 1 | 1 | 0 | 0 | 0 |
| A1 (='1') | B1-1 | 0 | 0 | 1 | 1 | 1 | 1 | 1 | 1 | 1 | 0 | 0 | 0 | 0 | 0 | 0 |
|  | B1-2 | 0 | 0 | 0 | 0 | 1 | 1 | 1 | 1 | 0 | 0 | 0 | 0 | 0 | 0 | 0 |
|  | B1-3 | 0 | 0 | 0 | 0 | 0 | 1 | 1 | 1 | 0 | 0 | 0 | 0 | 0 | 0 | 0 |
|  | B1-4 | 0 | 0 | 0 | 0 | 1 | 1 | 1 | 1 | 0 | 0 | 0 | 0 | 0 | 0 | 0 |
| A2 (='1') | B2-1 | 0 | 1 | 1 | 1 | 1 | 1 | 1 | 1 | 0 | 0 | 0 | 0 | 0 | 0 | 0 |
|  | B2-2 | 0 | 0 | 1 | 1 | 1 | 1 | 1 | 1 | 0 | 0 | 0 | 0 | 0 | 0 | 0 |
|  | B2-3 | 0 | 0 | 0 | 0 | 1 | 1 | 1 | 1 | 1 | 1 | 0 | 0 | 0 | 0 | 0 |
|  | B2-4 | 0 | 0 | 0 | 0 | 0 | 1 | 1 | 1 | 1 | 0 | 0 | 0 | 0 | 0 | 0 |
| ⋮ | ⋮ | | | | | | ⋮ | | | | | | | | | |
| An (='1') | Bn-1 | 0 | 0 | 1 | 1 | 1 | 1 | 1 | 1 | 0 | 0 | 0 | 0 | 0 | 0 | 0 |
|  | Bn-2 | 0 | 0 | 0 | 0 | 0 | 1 | 1 | 1 | 0 | 0 | 0 | 0 | 0 | 0 | 0 |
|  | Bn-3 | 0 | 0 | 0 | 0 | 1 | 1 | 1 | 1 | 1 | 1 | 0 | 0 | 0 | 0 | 0 |
|  | Bn-4 | 0 | 0 | 0 | 0 | 1 | 1 | 1 | 1 | 1 | 0 | 0 | 0 | 0 | 0 | 0 |

CLOCK ADJUSTING METHOD AND CIRCUIT DEVICE

This application is a Division of application Ser. No. 09/537,776 filed Mar. 29, 2000.

BACKGROUND OF THE INVENTION

1. Field of the Invention

The present invention generally relates to clock adjusting methods and circuit devices, and more particularly to a clock adjusting method for a device which uses a flip-flop for input and output, and to a circuit device which employs such a clock adjusting method.

Recently, in electronic computers and the like, delay type (D-type) flip-flops are arranged between the input and output of circuits, and signals are transmitted by synchronizing the D-type flip-flops by a clock. If there exists a path having a slow signal transmission between the D-type flip-flops, it may not be possible to transmit and receive the signals. For this reason, the clock phase of the D-type flip-flop on the transmitting side and the clock phase of the D-type flip-flop on the receiving side are adjusted to optimum values.

On the other hand, due to increasing operating speeds of electronic computers, the frequency of the clock is also increasing. Consequently, there are demands to increase the adjusting accuracy with which the phase error between the clock of the transmitting side D-type flip-flop and the receiving side D-type flip-flop is adjusted.

2. Description of the Related Art

FIG. 1 is a system block diagram showing an example of a conventional circuit device. In FIG. 1, a signal processing circuit 1 and a signal processing circuit 2 are coupled via a transmission path 3. A D-type flip-flop 4 is provided at a signal output part of the signal processing circuit 1. On the other hand, a D-type flip-flop 5 is provided at a signal input part of the signal processing circuit 2.

External clocks CLKA and CLKB are respectively supplied to the D-type flip-flops 4 and 5. The clocks CLKA and CLKB which are supplied to the D-type flip-flops 4 and 5 are originated from a clock oscillator 6. A clock generated from the clock oscillator 6 is supplied to the D-type flip-flop 4 via a delay adjusting circuit 7 as the clock CLKA on one hand, and is supplied to the D-type flip-flop 5 via a delay adjusting circuit 8 as the clock CLKB on the other.

Delay quantities (or delay times) of the delay adjusting circuits 7 and 8 are set by taking into consideration the delay of the transmission path 3 and the delays of the clocks CLKA and CLKB supplied to the D-type flip-flops 4 and 5. In other words, optimum values of the delay quantities of the delay adjusting circuits 7 and 8 are calculated so as to supply the clocks CLKA and CLKB to the respective D-type flip-flops 4 and 5 so that the signal transmitted from the D-type flip-flop 4 can be accurately received by the D-type flip-flop 5. The calculated optimum values are set to the delay adjusting circuits 7 and 8 as they are, as the delay quantities.

FIG. 2 is a system block diagram showing another example of the conventional circuit device. In FIG. 2, those parts which are the same as those corresponding parts in FIG. 1 are designated by the same reference numerals, and a description thereof will be omitted.

In FIG. 2, a test pattern generating circuit 10 and a selector 9 are provided on the transmitting side, and a test pattern generating circuit 11 and a comparator circuit 12 are provided in the receiving side.

When making the adjustment, the selector 9 on the transmitting side selects an output test pattern of the test pattern generating circuit 10. The selected output test pattern is held by the D-type flip-flop 4, and is transmitted to the D-type flip-flop 5 via the transmission path 3. On the other hand, at the receiving side, the comparator circuit 12 compares the test pattern received by the D-type flip-flop 5 and a test pattern which is generated from the test pattern generating circuit 11, so as to judge whether or not the signals are correctly transmitted. The above described operation is carried out while varying the delay quantities of the delay adjusting circuits 7 and 8, so as to determine the delay quantities with which a correct comparison result is obtained at the comparator circuit 12.

However, according to the clock adjusting method described with reference to FIG. 1, the delay quantities of the delay adjusting circuits are calculated from the delay of the transmission path and the like, and the calculated delay quantities are set in the delay adjusting circuits. For this reason, there is a problem in that it is impossible to adjust inconsistencies which are inevitably introduced among the individual circuit devices due to production inconsistencies.

In addition, in a case where the test pattern generating circuits are provided in the circuit device in order to measure the delay quantities for each individual circuit device, as described with reference to FIG. 2. there is a problem in that the circuit construction of the circuit device becomes complex due to the provision of the test pattern generating circuits.

SUMMARY OF THE INVENTION

Accordingly, it is a general object of the present invention to provide a novel and useful clock adjusting method and circuit device, in which the problems described above are eliminated.

Another and more specific object of the present invention is to provide a clock adjusting method and circuit device, which can adjust clocks of individual circuit devices using a relatively simple circuit construction.

Still another object of the present invention is to provide a clock adjusting method for adjusting a first clock supplied to a first flip-flop which is coupled to an output of a first circuit and a second clock supplied to a second flip-flop which is coupled to an input of a second circuit, the first and second flip-flops being coupled via a transmission path, where the clock adjusting method comprises the steps of (a) transmitting data from the first flip-flop to the second flip-flop via the transmission path while varying delay quantities of the first and second clocks, (b) obtaining a combination of the delay quantities of the first and second clocks with which the data is correctly transmitted from the first flip-flop to the second flip-flop, and (c) adjusting the delay quantity of at least one of the first and second clocks based on the combination so as to synchronize operations of the first and second flip-flops. According to the clock adjusting method of the present invention, it is possible to easily adjust the clock without the need to set test patterns.

A further object of the present invention is to provide a clock adjusting method for adjusting a first clock supplied to an output flip-flop and a second clock supplied to an input flip-flop in a circuit device so as to synchronize operations of the output flip-flop and the input flip-flop, the output flip-flop holding a state of an output signal of a signal processing circuit, the input flip-flop holding a state of a signal output from the output flip-flop, the first clock being output from a first adjusting circuit which delays a clock from a clock oscillator, the second clock being output from a second adjusting circuit which delays the clock from the clock oscillator, where the clock adjusting method comprises an output state detecting procedure, detecting output signal states of the output flip-flop and the input flip-flop by repeating an operation of controlling the clock oscillator to supply the first clock to the output flip-flop and the second clock to the input flip-flop while varying delay quantities of the first and second adjusting circuits, and a delay quantity setting procedure, detecting a combination of delay quantities of the first and second adjusting circuits with which the output signal state of the output flip-flop is correctly transmitted to the input flip-flop, based on the output signal states of the output flip-flop and the input flip-flop detected by the output state detecting procedure, and setting the delay quantities of the first and second adjusting circuits depending on the detected combination. According to the clock adjusting method of the present invention, it is possible to easily adjust the clock without the need to set test patterns.

Another object of the present invention is to provide a circuit device comprising a signal processing circuit outputting an output signal depending on a signal processing result, an output flip-flop holding a state of the output signal of the signal processing circuit, an input flip-flop holding a state of a signal output from the output flip-flop, a clock oscillator generating a clock, a first adjusting circuit delaying the clock from the clock oscillator and supplying a first clock to the output flip-flop, a second adjusting circuit delaying the clock from the clock oscillator and supplying a second clock to the input flip-flop, an inverter circuit inverting the output signal state of the output flip-flop, and a selector, coupled between an input of the output flip-flop and outputs of the signal processing circuit and the inverter circuit, selectively outputting to the output flip-flop one of the output signal state of the signal processing circuit and the output signal state of the inverter circuit depending on a selection signal. According to the circuit device of the present invention, it is possible to easily adjust the clock without the need to set test patterns.

Other objects and further features of the present invention will be apparent from the following detailed description when read in conjunction with the accompanying drawings.

BRIEF DESCRIPTION OF THE DRAWINGS

FIG. 11 is a diagram showing the data structure of a data reception result table of the second embodiment.

DESCRIPTION OF THE PREFERRED EMBODIMENTS

Figure 1:
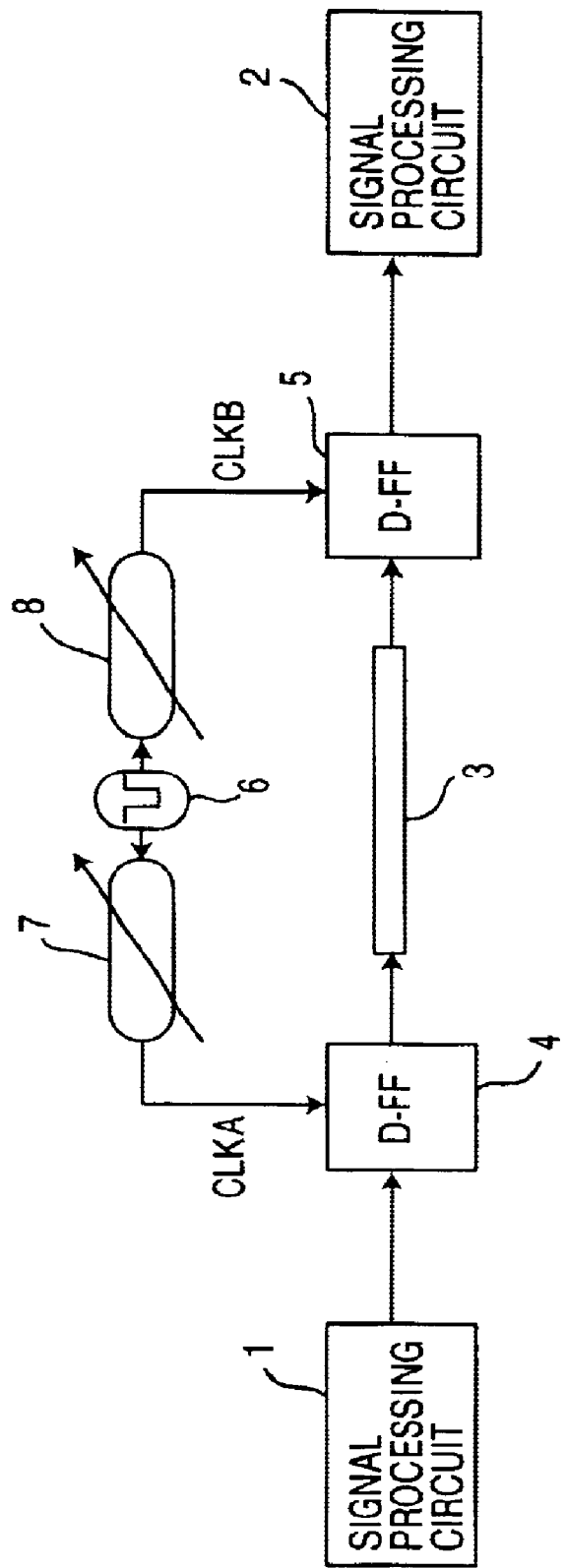
FIG. 1 is a system block diagram showing an example of a conventional circuit device.
Figure 2:
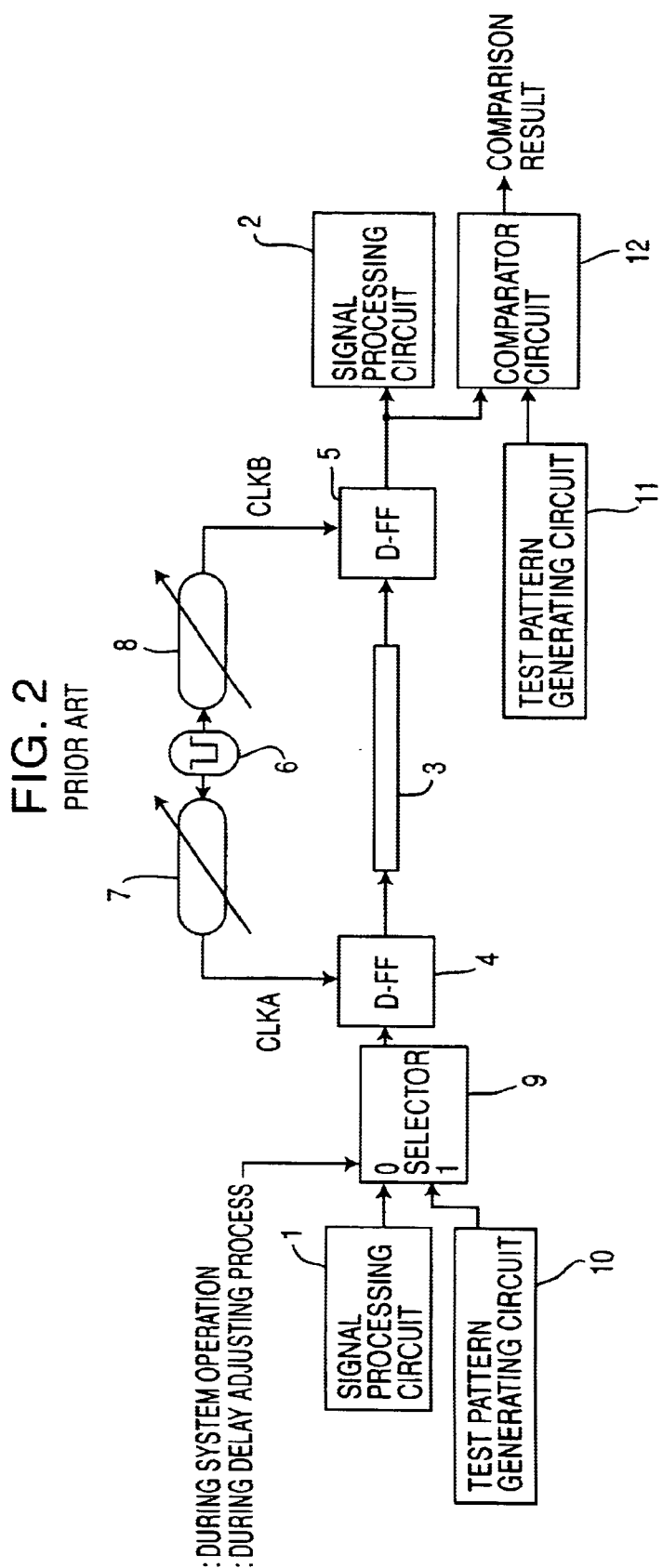
FIG. 2 is a system block diagram showing another example of the conventional circuit device.
Figure 3:
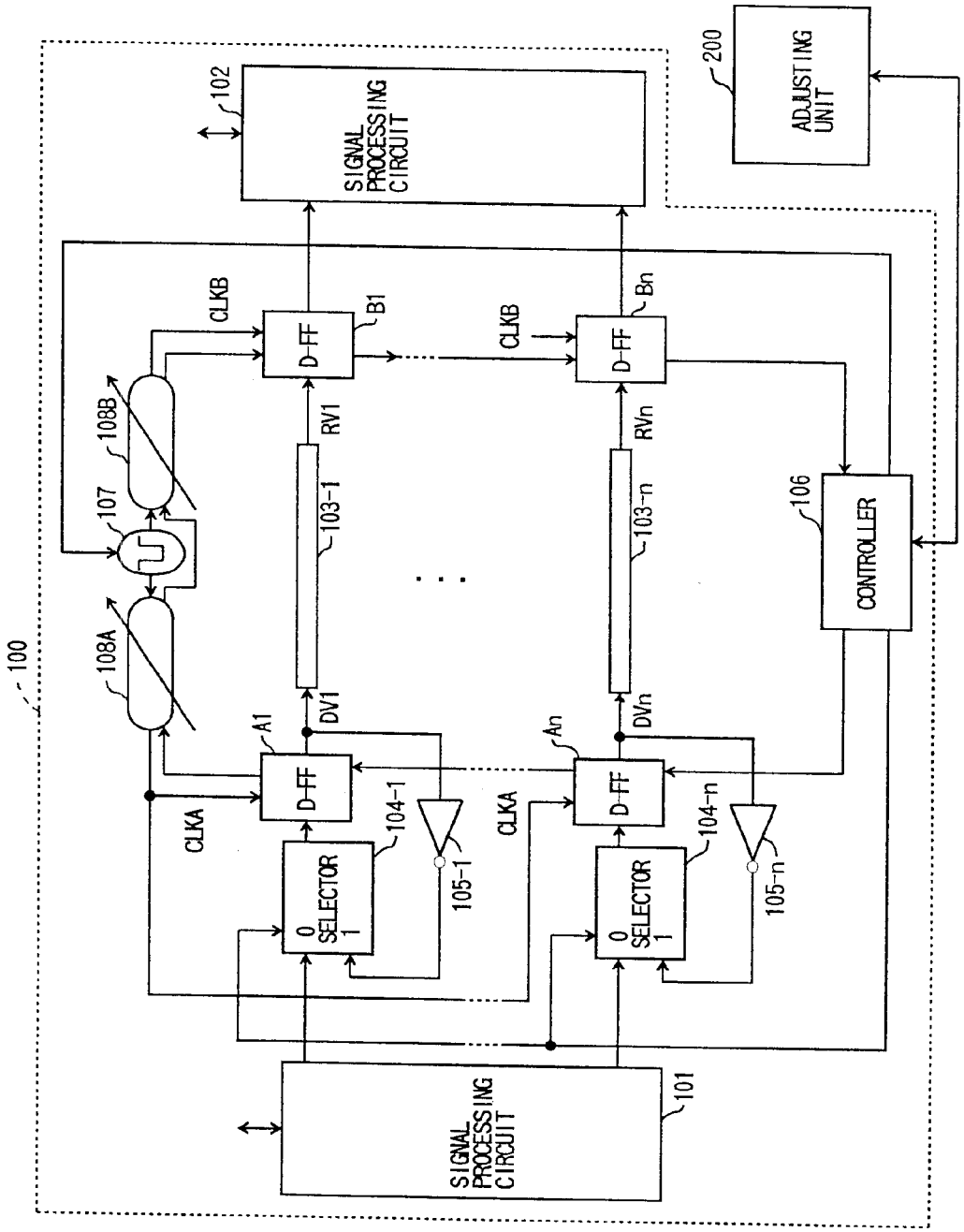
FIG. 3 is a system block diagram showing a first embodiment of a circuit device according to the present invention.

FIG. 3 is a system block diagram showing a first embodiment of a circuit device according to the present invention. This first embodiment of the circuit device employs a first embodiment of a clock adjusting method according to the present invention. In this embodiment, a circuit device 100 is coupled to an adjusting unit 200 which adjusts phases of clocks.

The circuit device 100 includes signal processing circuits 101 and 102, transmitting side D-type flip-flops A1 through An, receiving side D-type flip-flops B1 through Bn, transmission paths 103-1 through 103-n, selectors 104-1 through 104-n, inverters 105-1 through 105-n, a controller 106, a clock oscillator 107, and delay adjusting circuits 108A and 108B which are connected as shown in FIG. 3.

The signal processing circuit 101 is coupled to the transmitting side D-type flip-flops A1 through An via the selectors 104-1 through 104-n. The selectors 104-1 through 104-n select output signals of the signal processing circuit 101 or output signals of the transmitting side D-type flip-flops A1 through An which are inverted by the inverters 105-1 through 105-n, depending on a selection signal which is supplied from the controller 106. The selected output signals from the selectors 104-1 through 104-n are supplied to the transmitting side D-type flip-flops A1 through An.

Figure 4:
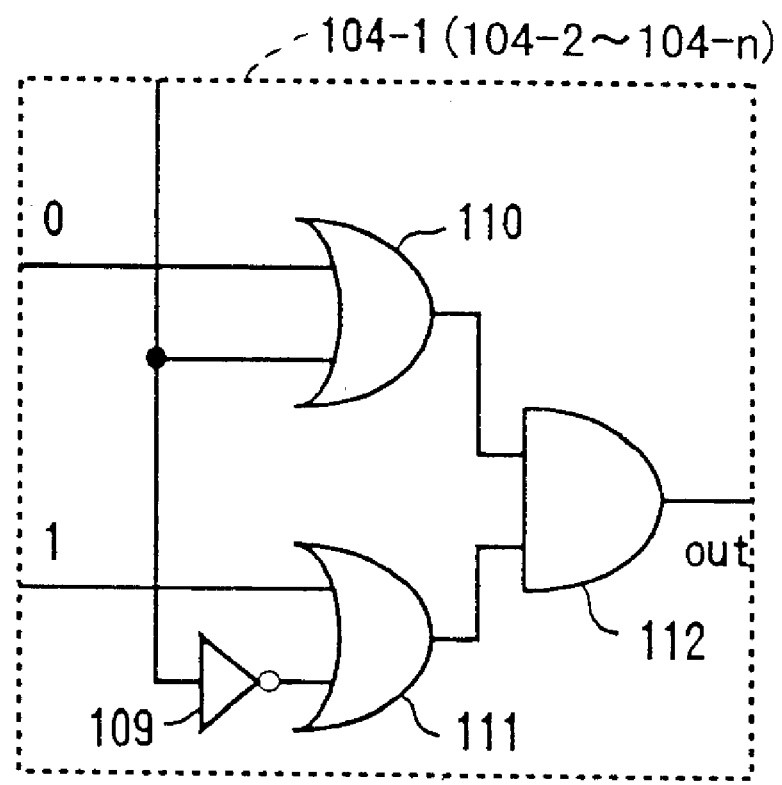
FIG. 4 is a circuit diagram showing the construction of a selector of the first embodiment.

FIG. 4 is a circuit diagram showing the construction of one of the selectors 104-1 through 104-n of the first embodiment. All of the selectors 104-1 through 104-n have the same construction shown in FIG. 4.

In other words, each of the selectors 104-1 through 104-n includes an inverter 109, OR gates 110 and 111, and an AND gate 112, as shown in FIG. 4. A corresponding one of the output signals of the signal processing circuit 101 and the selection signal from the controller 106 are supplied to the OR gate 110. Hence, the OR gate 110 outputs a logical-OR of the output signal of the signal processing circuit 101 and the selection signal from the controller 106.

In addition, the output signal of a corresponding one of the inverters 105-1 through 105-n, and the selection signal from the controller 106 which is inverted by the inverter 109, are supplied to the OR gate 111. Hence, the OR gate 111 outputs a logical-OR of the output signal of the corresponding one of the inverters 105-1 through 105-n and the selection signal from the controller 106 which is inverted by the inverter 109.

Output signals of the OR gates 110 and 111 are supplied to the AND gate 112. Thus, the AND gate 112 obtains a logical-AND of the output signals of the OR gates 110 and 111.

In each of the selectors 104-1 through 104-n, the inverter 109 makes the output signal level of the OR gate 111 always "1" if the selection signal from the controller 106 is "0". In addition, the output signal of the OR gate 110 becomes the output signal of the signal processing circuit 101.

If the output signal of the OR gate 110 becomes the output signal of the signal processing circuit 101 and the output signal of the OR gate 111 is always "1", the output signal of the AND gate 112 becomes the output signal of the signal processing circuit 101. As a result, the AND gate 112 outputs the output signal of the signal processing circuit 101 if the selection signal from the controller 106 is "0".

On the other hand, in each of the selectors 104-1 through 104-n, the output signal level of the-OR gate 110 always becomes "1" if the selection signal from the controller 106 is "1". In addition, the output signal of the OR gate 111 becomes the output signal of the corresponding one of the inverters 105-1 through 105-n.

If the output signal of the OR gate 110 is always "1" and the output signal of the OR gate 111 becomes the output signal of the corresponding one of the inverters 105-1 through 105-n, the output signal of the AND gate 112 becomes the output signal of the corresponding one of the inverters 105-1 through 105-n. As a result, the AND gate 112 outputs the output signal of the corresponding one of the inverters 105-1 through 105-n if the selection signal from the controller 106 is "1".

Therefore, it is possible to select the output signals of the signal processing circuit 101 or the output signals of the inverters 105-1 through 105-n for use in the adjustment which will be described later, depending on the selection signal from the controller 106.

Returning now to the description of FIG. 3, the D-type flip-flops A1 through An hold the states of the signals selected by the corresponding selectors 104-1 through 104-n, depending on a clock CLKA which is supplied from the clock oscillator 107 and received via the delay adjusting circuit 108A.

The D-type flip-flops A1 through An and the delay adjusting circuit 108A are connected to the controller 106, and are constructed so that a scan in conformance with JTAG-SCAN (Joint Test Action Group boundary scan) can be made under the control of the controller 106. The signal states held by the D-type flip-flops A1 through An are supplied to the selectors 104-1 through 104-n via the corresponding inverters 105-1 through 105-n, and are also supplied to the receiving side flip-flops B1 through Bn via the corresponding transmission paths 103-1 through 103-n.

The D-type flip-flops B1 through Bn hold the states of the signals received via the transmission paths 103-1 through 103-n, depending on a clock CLKB which is supplied from the clock oscillator 107 and received via the delay adjusting circuit 108B. The D-type flip-flops B1 through Bn and the delay adjusting circuit 108B are connected to the controller 106, and are constructed so that a scan in conformance with the JTAG-SCAN can be made under the control of the controller 106.

In other words, the transmitting side D-type flip-flops A1 through An and the receiving side D-type flip-flops B1 through Bn comprise boundary scan register cells in conformance with the JTAG-SCAN.

Next, a more detailed description will be given of the delay adjusting circuits 108A and 108B.

Figure 5:
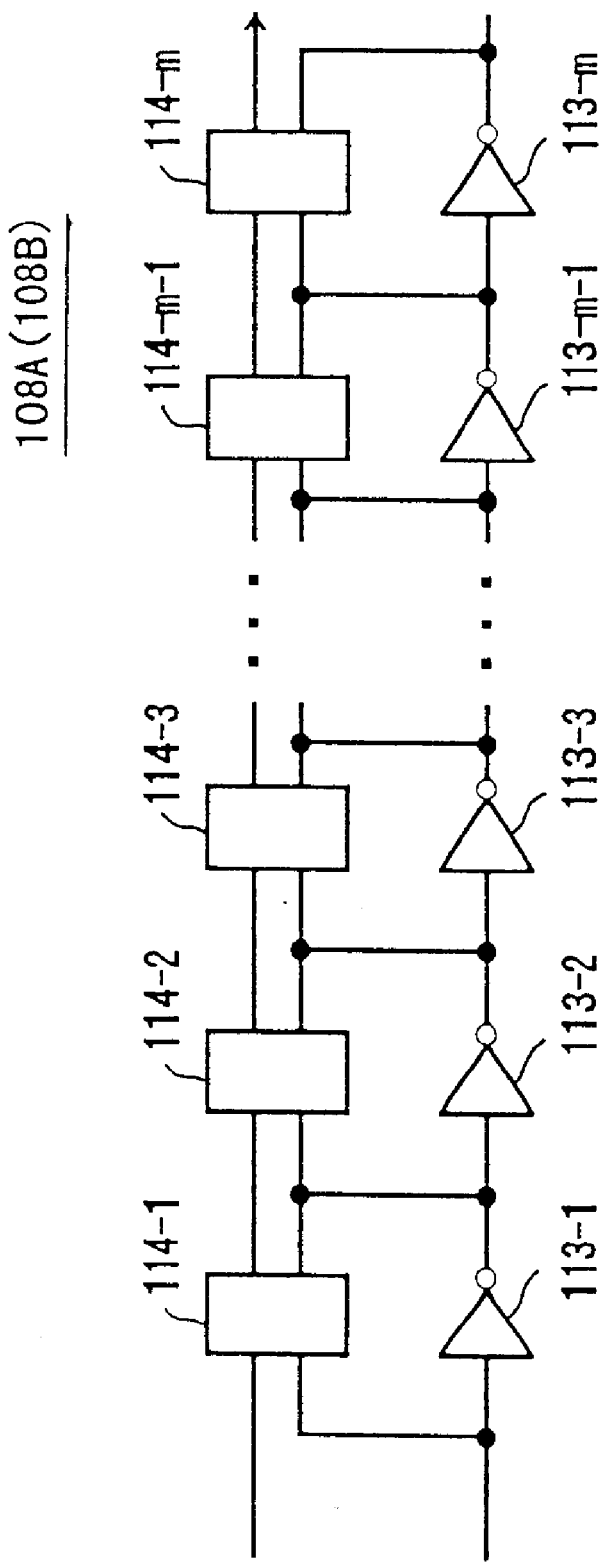
FIG. 5 is a circuit diagram showing the construction of a delay adjusting circuit of the first embodiment.

FIG. 5 is a circuit diagram showing the construction of one of the delay adjusting circuits 108A and 108B of the first embodiment. Both the delay adjusting circuits 108A and 108B have the same construction shown in FIG. 5.

As shown in FIG. 5, each of the delay adjusting circuits 108A and 108B includes inverters 113-1 through 113-m, and flip-flops 114-1 through 114-m. The flip-flops 114-1 through 114-m are connected to the controller 106, and are constructed so that the scan in conformance with the JTAG-SCAN is possible under the control of the controller 106 and so that paths of the inverters 113-1 through 113-m are controllable.

The controller 106 shown in FIG. 3 is connected to the adjusting unit 200 which is provided externally to the circuit device 100. This controller 106 controls the JTAG-SCAN depending on an instruction from the adjusting unit 200.

Figure 6:
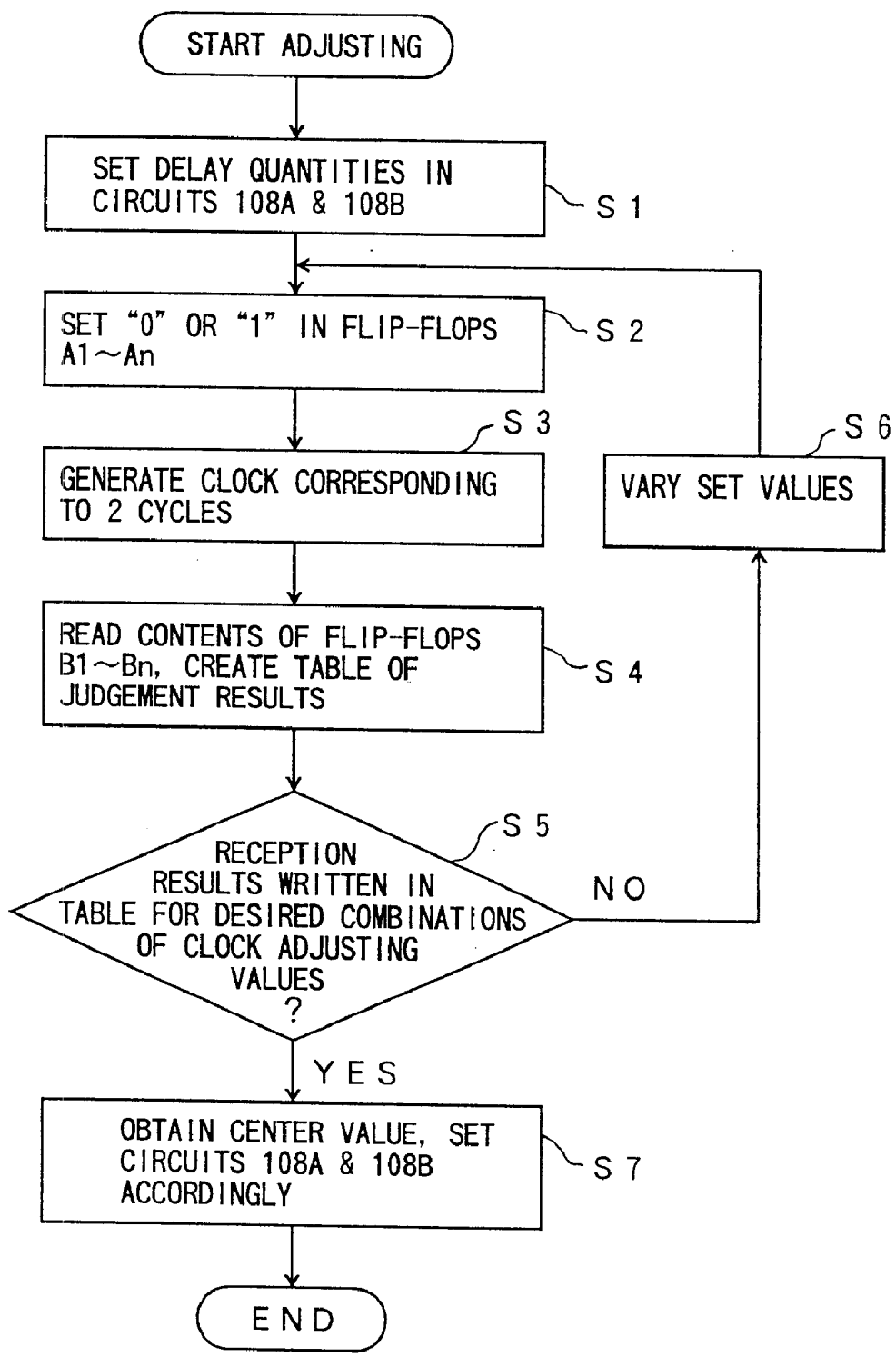
FIG. 6 is a flow chart for explaining the delay adjusting process of the first embodiment.

Next, a description will be given of the delay adjusting process of the adjusting unit 200. FIG. 6 is a flow chart for explaining the delay adjusting process of the adjusting unit 200 in this first embodiment.

When carrying out the delay adjusting process, the adjusting unit 200 controls the controller 106 so that the selection signal supplied to the selectors 104-1 through 104-n becomes "1". When the selection signal supplied to the selectors 104-1 through 104-n from the controller 106 becomes "1", the outputs of the transmitting side D-type flip-flops A1 through An become coupled to the inputs of the transmitting side D-type flip-flops A1 through An via the corresponding inverters 105-1 through 105-n. Since the inputs and outputs of the transmitting side D-type flip-flops A1 through An become coupled via the inverters 105-1 through 105-n by the selectors 104-1 through 104-n, the transmitting side D-type flip-flops A1 through An function as trigger type (T-type) flip-flops. As a result, the T-type flip-flops output signals which are successively inverted depending on the clock CLKA which is supplied from the clock oscillator 107 and is received via the delay adjusting circuit 108A.

After the controller 106 controls the selectors 104-1 through 104-n and the connections of transmitting side D-type flip-flops A1 through An are switched to that for the clock phase adjustment as described above, a step S1 shown in FIG. 6 sets predetermined delay quantities in the clock adjusting circuits 108A and 108B by using the JTAG-SCAN function of the controller 106.

Then, a step S2 sets a predetermined value "0" or "1" to the transmitting side D-type flip-flops A1 through An by using the JTAG-SCAN function of the controller 106.

After the predetermined delay quantities are set in the clock adjusting circuits 108A and 108B in the step S1, a step S3 generates from the clock oscillator 107 a clock corresponding to two clock cycles at the time of the system operation.

Data pulses having values which are inverted with respect to the values set in the transmitting side D-type flip-flops A1 through An, are generated responsive to the clock CLKA which is supplied from the clock oscillator 107 and is received via the clock adjusting circuit 108A.

The data pulses generated from the transmitting side D-type flip-flops A1 through An are supplied to the receiving side D-type flip-flops B1 through Bn via the transmission paths 103-1 through 103-n. The receiving side D-type flip-flops B1 through Bn hold the signals received via the transmission paths 103-1 through 103-n, depending on the clock CLKB which is supplied from the clock oscillator 107 and is received via the clock adjusting circuit 108B.

Next, a step S4 controls the controller 106 so as to read the data held in the receiving side D-type flip-flops B1 through Bn by the JTAG-SCAN function. The step S4 also compares the data held in the receiving side D-type flip-flops B1 through Bn and the data held in the transmitting side D-type flip-flops A1 through An, and judges whether or not the signals are correctly transmitted. The signals are correctly transmitted if the data (or values) held in the receiving side D-type flip-flops B1 through Bn are inverted with respect to the data (or values) held in the corresponding transmitting side D-type flip-flops A1 through An. Furthermore, the step S4 stores, in the form of a table, the judgement result for the compared data held in each of the receiving side and transmitting side D-type flip-flop pairs.

A description will now be given of the data holding operations of the transmitting side D-type flip-flops A1 through An and the receiving side D-type flip-flops B1 through Bn, when carrying out the delay adjusting process.

Figure 7:
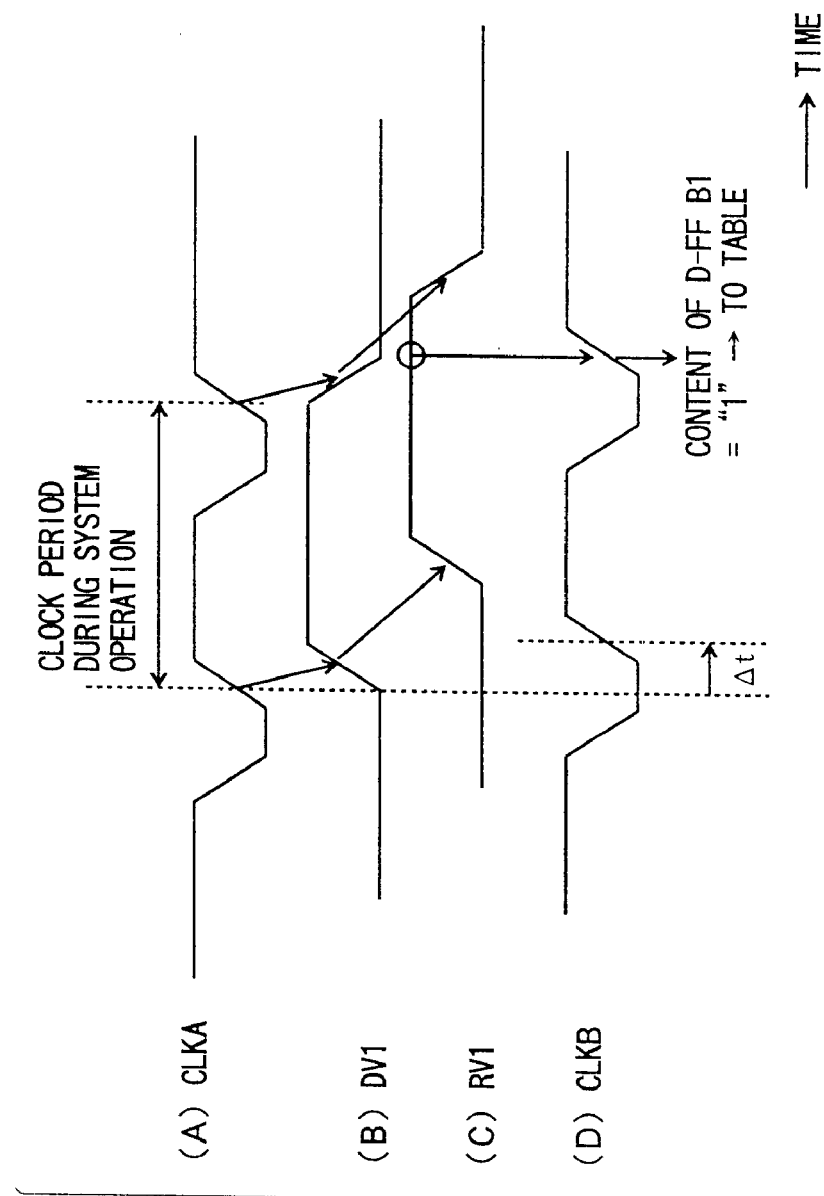
FIGS. 7(A) through 7(D) are timing charts for explaining the operation of the first embodiment when adjusting clock.

FIGS. 7(A) through 7(D) are timing charts for explaining the operation of this first embodiment when adjusting the clock. FIG. 7(A) shows the output clock CLKA of the clock adjusting circuit 108A, FIG. 7(B) shows the output data pulses DV1 of the transmitting side D-type flip-flops A1 through An, FIG. 7(C) shows the input data pulses RV1 of the receiving side D-type flip-flops B1 through Bn, and FIG. 7(D) shows the output clock CLKB of the clock adjusting circuit 108B. A time error Δt indicates an error between the delay quantity set in the clock adjusting circuit 108A and the delay quantity set in the clock adjusting circuit 108B.

The transmitting side D-type flip-flops A1 through An hold the data DV1 shown in FIG. 7(B) which are input at a rising edge of the clock CLKA shown in FIG. 7(A) which is obtained from the clock adjusting circuit 108A.

The data DV1 shown in FIG. 7(B) are supplied to the receiving side D-type flip-flops B1 through Bn via the transmission paths 103-1 through 103-n. Hence, the receiving side D-type flip-flops B1 through Bn receive the data RV1 shown in FIG. 7(C), and hold the data RV1 in response to the clock CLKB shown in FIG. 7(D) obtained from the clock adjusting circuit 108B.

The data read from the receiving side D-type flip-flop B1 through Bn by the JTAG-SCAN function of the controller 106 are supplied to the adjusting unit 200. The adjusting unit 200 compares the reception results of the receiving side D-type flip-flops B1 through Bn read by the controller 106 and the data held in the transmitting side D-type flip-flops A1 through An, and creates a data reception result table based on the comparison. In the data reception result table, the reception results are indicated by "1" if the reception results obtained at the receiving side D-type flip-flops B1 through Bn correspond to the data held in the transmitting side D-type flip-flops A1 through An, and are indicated by "0" if the reception results obtained at the receiving side D-type flip-flops B1 through Bn do not correspond to the data held in the transmitting side D-type flip-flops A1 through An.

Next, a step S5 shown in FIG. 6 decides whether or not the reception results are written in the data reception result table for desired combinations of clock adjusting values, that is, the delay quantities set in the clock adjusting circuits 108A and 108B. If the decision result in the step S5 is NO, a step S6 varies the delay quantities of the clock adjusting circuits 108A and 108B by the JTAG-SCAN function, and the process returns to the step S2.

Hence, the above described operation is repeated, so that the clock corresponding to two clock cycles at the time of the system operation is generated from the clock oscillator 107, the data pulses are transmitted from the transmitting side D-type flip-flops A1 through An and received by the receiving side D-type flip-flops B1 through Bn, and the data reception result table is created based on the reception results. This operation is repeated until the reception results are written in the data reception result table for the desired combinations of the clock adjusting values. The process advances to a step S7 if the decision result in the step S5 is YES.

Figure 8:
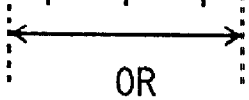
FIG. 8 is a diagram showing the data structure of a data reception result table of the first. embodiment.

FIG. 8 is a diagram showing the data structure of the data reception result table of this first embodiment. As shown in FIG. 8, "0"s and "1"s are set for each of the transmitting side D-type flip-flops A1 through An, the delay quantities of the clock adjusting circuits 108A and 108B are varied, and a reception result "1" which indicates a correct reception or a reception result "0" which indicates an incorrect reception is stored in the data reception result table for each of the receiving side D-type flip-flops B1 through Bn.

The adjusting unit 200 detects the time error between the delay quantities of the clock adjusting circuits 108A and 108B with which the correct reception result "1" is obtained for each of the receiving side D-type flip-flops B1 through Bn. In this particular case, the correct reception results are obtained within an operating range OR shown in FIG. 8. In this operating range OR, the time error Δt (ns) between the delay quantities of the clock adjusting circuits 108A and 108B is 0 (ns), +1 (ns) or +2 (ns), and the correct reception result is obtained in all of the receiving side D-type flip-flops B1 through Bn. In FIG. 8, rectangular marks indicate the operation limit.

In the step S7 shown in FIG. 6, the adjusting unit 200 obtains the time error between the delay quantities of the clock adjusting circuits 108A and 108B with which the correct reception result can be obtained in each of the receiving side D-type flip-flops B1 through Bn, by referring to the data reception result table shown in FIG. 8. In addition, if the correct reception result is obtained for a plurality of time errors, that is, within the operating range OR, the center or intermediate value in the operating range OR is selected in the step S7 as the time error between the delay quantities which are to be set in the clock adjusting circuits 108A and 108B. Hence, in this particular case, the center value +1 (ns) is selected as the time error, and the delay quantities having this time error therebetween is set in the clock adjusting circuits 108A and 108B. The process ends after the step S7. This center value +1 (ns) has the largest operating margin with respect to the delay quantities.

Basically, "0"s and "1"s are set with respect to each of the transmitting side D-type flip-flops A1 through An, and the reception results at the receiving side D-type flip-flops B1 through Bn are stored in the data reception result table. However, in a case where interference is likely to occur due to reflection or the like between the adjacent circuits, it is possible to supply the clock from the clock oscillator 107 a plurality of times, and to create the data reception result table shown in FIG. 8 based on results of transmissions and receptions made responsive to the latter supplied clock.

Figure 9:
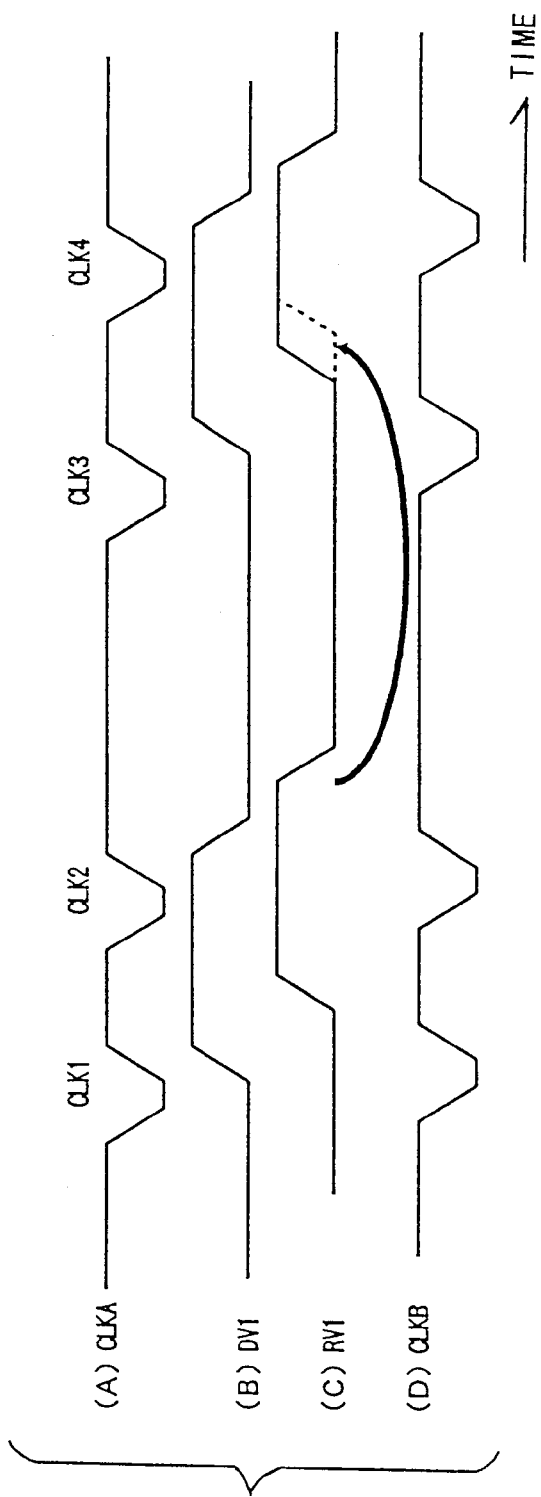
FIGS. 9(A) through 9(D) are timing charts for explaining the operation of a modification of the first embodiment.

FIGS. 9(A) through 9(D) are timing charts for explaining the operation of a modification of the first embodiment when adjusting the clock. FIG. 9(A) shows the output clock CLKA of the clock adjusting circuit 108A, FIG. 9(B) shows the output data pulses DV1 of the transmitting side D-type flip-flops A1 through An, FIG. 9(C) shows the input data pulses RV1 of the receiving side D-type flip-flops B1 through Bn, and FIG. 9(D) shows the output clock CLKB of the clock adjusting circuit 108B.

As shown in FIG. 9(A), after generating clock pulses CLK1 and CLK2 of the clock CLKA, clock pulses CLK3 and CLK4 are generated. In this modification, the data reception result table shown in FIG. 8 is created using the data which are transmitted and received responsive to the latter clock pulses CLK3 and CLK4. The delay quantities of the clock adjusting circuits 108A and 108B are then adjusted based on the time error obtained from the data reception result table.

By generating the clock pulses CLK1 and CLK2 and thereafter generating the clock pulses CLK3 and CLK4 of the clock CLKA, and using the timings of the latter clock pulses CLK3 and CLK4 to transmit and receive the data, it becomes possible to take into consideration the interference such as reflection of the data on the transmission paths 103-1 through 103-n generated due to the clock pulses CLK1 and CLK2, when adjusting the clock. In other words, since the effects of the interference on the data transmitted and received responsive to the clock pulses CLK1 and CLK2 can be reflected to the data transmitted and received responsive to the clock pulses CLK3 and, CLK4, the interference is taken into consideration when the clock is adjusted based on the reception results which are obtained by transmitting and receiving the data responsive to the clock pulses CLK3 and CLK4.

Of course, the reception results may be judged by setting the data pattern of the data which are transmitted and received to patterns such as "01010" and "00100", for example.

In the first embodiment and modification described above, one receiving side D-type flip-flop is provided with respect to one transmitting side D-type flip-flop. However, it is of course possible to apply the present invention in an arrangement in which a plurality of receiving side D-type flip-flops are provided with respect to one transmitting side D-type flip-flop.

Figure 10:
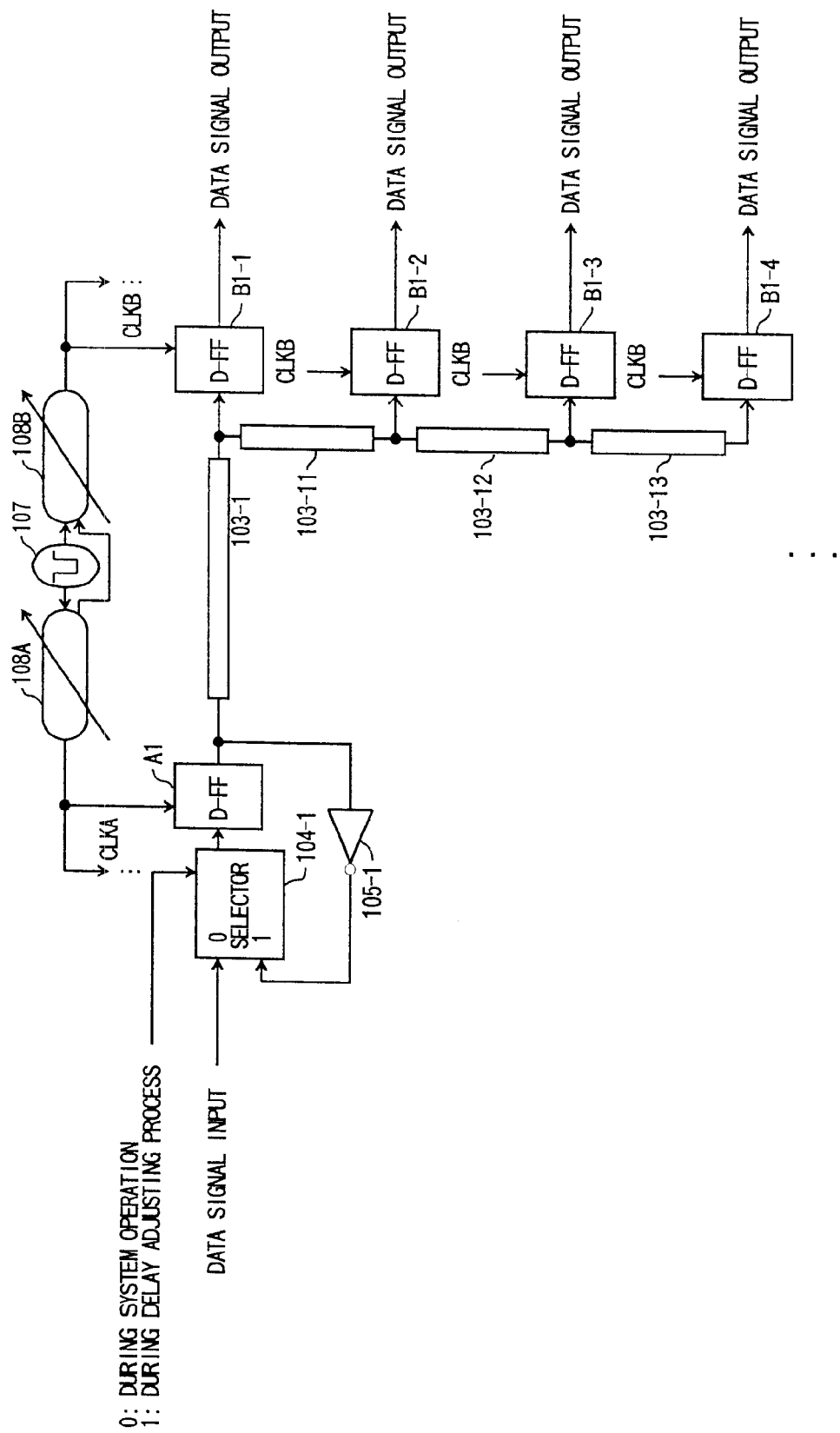
FIG. 10 is a system block diagram showing an important part of a second embodiment of the circuit device according to the present invention.

FIG. 10 is a system block diagram showing an important part of a second embodiment of the circuit device according to the present invention. This second embodiment of the circuit device employs a second embodiment of the clock adjusting method according to the present invention. In FIG. 10, those parts which are the same as those corresponding parts in FIG. 3 are designated by the same reference numerals, and a description thereof will be omitted.

In this embodiment, a plurality of receiving side D-type flip-flops B1-1 through B1-4 are connected with respect to one transmitting side D-type flip-flop A1. Hence, with respect to a transmission result of one transmitting side D-type flip-flop A1, reception results are obtained at a plurality of receiving side D-type flip-flops B1-1 through B1-4. Accordingly, the reception results are obtained at a plurality of receiving side D-type flip-flops B1-1 through B1-4, B2-1 through B2-4, . . . , and Bn-1 through Bn-4 with respect to the transmission results of the corresponding transmitting side D-type flip-flops A1 through An. For the sake of convenience, the illustration of the transmitting side D-type flip-flops A2 through An and the corresponding receiving side D-type flip-flops B2-1 through B2-4, . . . , and Bn-1 through Bn-4 is omitted in FIG. 10.

FIG. 11 is a diagram showing the data structure of the data reception result table of this second embodiment.

As shown in FIG. 11, the reception results of the plurality of receiving side D-type flip-flops B1-1 through B1-4 are stored in the data reception result table with respect to the data "0" and "1" transmitted from the transmitting side D-type flip-flop A1. The reception results of the receiving side D-type flip-flops B2-1 through B2-4, . . . , and Bn-1 through Bn-4 are similarly stored with respect to the data "0"s and "1"s transmitted from the corresponding transmitting side D-type flip-flops A2 through An.

Hence, in this embodiment, the time error Δt between the delay quantities of the clock adjusting circuits 108A and 108B with which the correct reception result "1" is obtained at all of the receiving side D-type flip-flops B1-1 through B1-4, B2-1 through B2-4, . . . , and Bn-1 through Bn-4. In FIG. 11, the correct reception result "1" is obtained for all of the receiving side D-type flip-flops B1-1 through B1-4, B2-1 through B2-4, . . . , and Bn-1 through Bn-4 for the time errors Δt of "−2", "−1" and "0". Hence, the center value "1" is set as the time error Δt between the delay quantities which are to be set in the clock adjusting circuits 108A and 108B.

Therefore, even in this embodiment where a plurality of receiving side D-type flip-flops are provided with respect to each transmitting side D-type flip-flop, it is possible to create the data reception result table shown in FIG. 11 based on the reception results obtained by the JTAG-SCAN function. Hence, the clock adjustment may easily be made based on the stored data of the data reception result table, similarly to the first embodiment described above.

In this embodiment, one-way transmission is made from the transmission side D-type flip-flops to the receiving side D-type flip-flops. However, the present invention is also applicable to a case where a two-way transmission is made.

Figure 12:
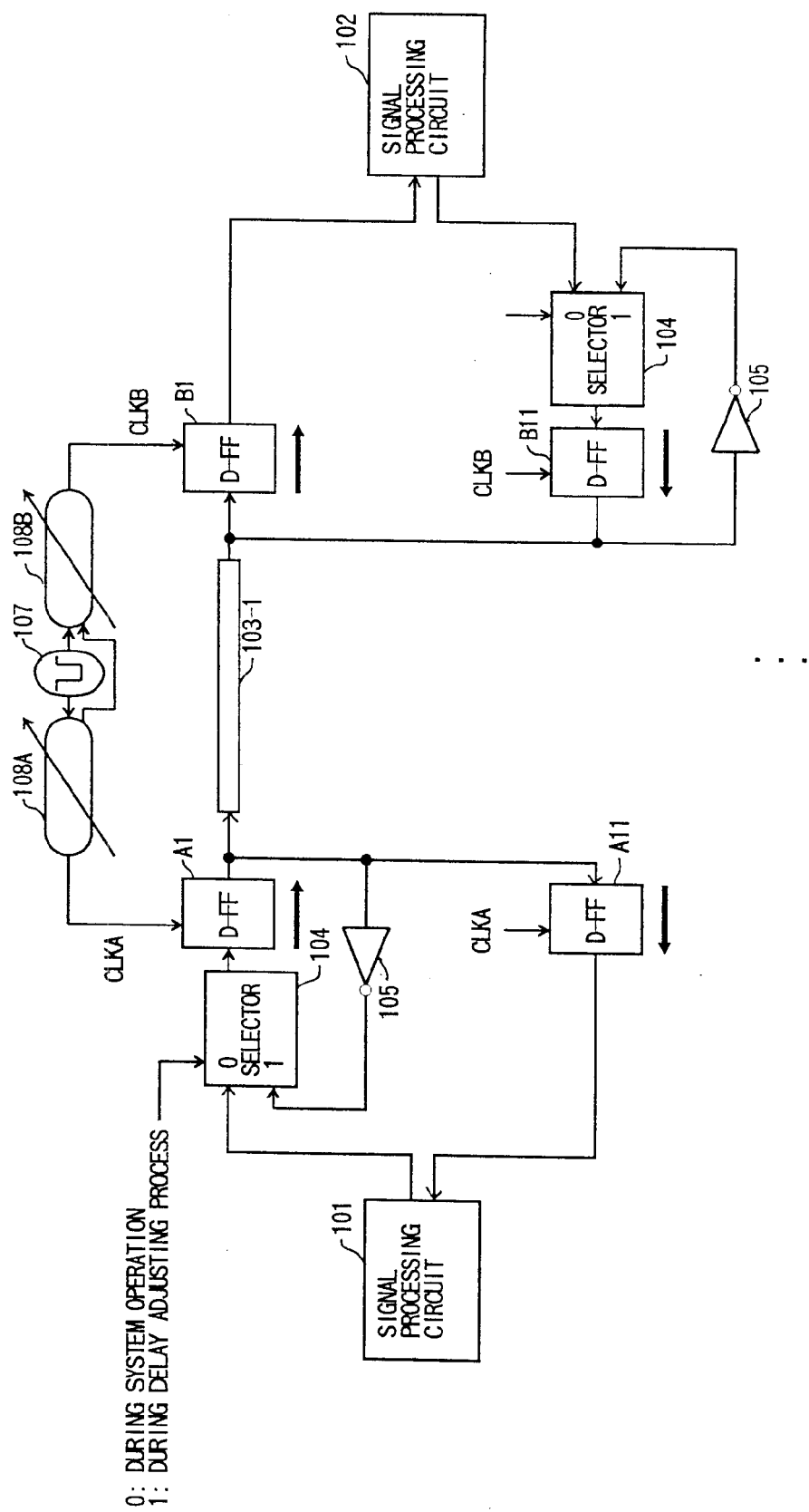
FIG. 12 is a system block diagram showing an important part of a third embodiment of the circuit device according to the present invention.

FIG. 12 is a system block diagram showing an important part of a third embodiment of the circuit device according to the present invention. This third embodiment of the circuit device employs a third embodiment of the clock adjusting method according to the present invention. In FIG. 12, those parts which are the same as those corresponding parts in FIG. 3 are designated by the same reference numerals, and a description thereof will be omitted.

In this embodiment, each of the transmission paths 103-1 through 103-n is capable of making a two-way transmission. In addition, a transmitting side D-type flip-flop and a receiving side D-type flip-flop is provided on both ends of each of the transmission paths 103-1 through 103-n. For the sake of convenience, FIG. 12 only shows a transmitting side D-type flip-flop A1 and a receiving side D-type flip-flop A11 at one end of the transmission path 103-1, and a receiving side D-type flip-flop B1 and a transmitting side D-type flip-flop B1 on the other end of the transmission path 103-1.

At the transmitting and receiving sides, an inverter 105 is provided with respect to each of the transmitting side D-type flip-flops A1 and B1. The inverter 105 inverts the output of the D-type flip-flop A1 or B1, and inputs the inverted output to the corresponding selector 104. Hence, at the transmitting side, the selector 104 selectively outputs the signal from the signal processing circuit 101 in response to a signal "0" during system operation, and selectively outputs the inverted signal from the inverter 105 in response to a signal "1" during the delay adjusting process. Similarly, at the receiving side, the selector 104 selectively outputs the signal from the signal processing circuit 102 in response to a signal "0" during system operation, and selectively outputs the inverted signal from the inverter 105 in response to a signal "1" during the delay adjusting process.

Further, the present invention is not limited to these embodiments, but various variations and modifications may be made without departing from the scope of the present invention.

What is claimed is:

1. A clock adjusting method for adjusting a first clock supplied to a first flip-flop which is coupled to an output of a first circuit, and a second clock supplied to a second flip-flop which is coupled to an input of a second circuit, said first and second flip-flops being coupled via a transmission path, said clock adjusting method comprising the steps of:

(a) controlling the first flip-flop to undergo a toggle operation by a controller during a clock adjusting mode so as to transmit data from the first flip-flop to the second flip-flop via the transmission path while varying delay quantities of the first and second clocks;

(b) obtaining by the controller a combination of the delay quantities of the first and second clocks with which the data is correctly transmitted from the first flip-flop to the second flip-flop; and (c) adjusting the delay quantity of at least one of the first and second clocks by the controller based on said combination so as to synchronize operations of the first and second flip-flops.

2. The clock adjusting method as claimed in claim 1, which further comprises the steps of:

(d) supplying a first plurality of clock pulses of the first and second clocks to the first and second flip-flops prior to said step (b), said step (b) obtaining said combination by supplying a second plurality of clock pulses of the first and second clocks to the first and second flip-flops subsequent to the first plurality of clock pulses of the first and second clocks.

3. The clock adjusting method as claimed in claim 1, wherein said step (b) obtains, from a plurality of combinations, a combination which provides a largest operating margin relative to the delay quantities.

4. The clock adjusting method as claimed in claim 1, wherein said step (b) detects correct transmission of data from the first flip-flop to the second flip-flop by making a boundary scan of output states of the first and second flip-flops.

5. The clock adjusting method as claimed in claim 1, wherein said step (b) obtains a table of a plurality of combinations of the delay quantities with which the data is correctly transmitted from the first flip-flop to the second flip-flop, and obtains from said table a combination which provides a largest operating margin relative to the delay quantities.

* * * * *